(12) United States Patent
Fujimoto

(10) Patent No.: US 11,770,078 B2
(45) Date of Patent: Sep. 26, 2023

(54) VIBRATION DEVICE AND DRIVING DEVICE

(71) Applicant: Murata Manufacturing Co., Ltd., Nagaokakyo (JP)

(72) Inventor: Katsumi Fujimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 495 days.

(21) Appl. No.: 16/991,487

(22) Filed: Aug. 12, 2020

(65) Prior Publication Data

US 2020/0373856 A1 Nov. 26, 2020

Related U.S. Application Data

(63) Continuation of application No. PCT/JP2018/046593, filed on Dec. 18, 2018.

(30) Foreign Application Priority Data

May 22, 2018 (JP) ................................ 2018-097900

(51) Int. Cl.
*H02N 2/00* (2006.01)
*B06B 1/06* (2006.01)
*H02N 2/18* (2006.01)

(52) U.S. Cl.
CPC ........... *H02N 2/001* (2013.01); *B06B 1/0651* (2013.01); *H02N 2/0075* (2013.01); *H02N 2/181* (2013.01); *H02N 2/005* (2013.01)

(58) Field of Classification Search
CPC ...... H02N 2/001; H02N 2/0075; H02N 2/181; H02N 2/005; B06B 1/0651; B06B 1/0276;
(Continued)

(56) References Cited

U.S. PATENT DOCUMENTS 5,554,904 A * 9/1996 Terajima ............ G01C 19/5649
310/317
6,116,086 A * 9/2000 Fujimoto ........... G01C 19/5642
310/329
(Continued)

FOREIGN PATENT DOCUMENTS

JP 200432191 A 1/2004
JP 200867447 A 3/2008
(Continued)

OTHER PUBLICATIONS

Machine translation of JP 5948781 (Year: 2011).*
(Continued)

*Primary Examiner* — Emily P Pham
(74) *Attorney, Agent, or Firm* — ArentFox Schiff LLP

(57) ABSTRACT

A vibration device is provided that includes a vibration element with a piezoelectric vibrator and a driving device that causes the vibration element to vibrate. The vibration element includes a translucent body and the piezoelectric vibrator is electrically coupled to the driving device. The driving device includes a first circuit that applies an electric signal to the piezoelectric vibrator to render the vibration element in a resonant state, a second circuit that applies an electric signal to the piezoelectric vibrator according to a feedback signal output from the piezoelectric vibrator, and a switch that switches coupling between the first circuit and the piezoelectric vibrator and coupling between the second circuit and the piezoelectric vibrator at a certain timing.

20 Claims, 9 Drawing Sheets

(58) Field of Classification Search
CPC .............. B06B 1/0261; B06B 2201/52; B06B 2201/55; B06B 2201/70; G02B 27/0006; G03B 17/08
See application file for complete search history.

(56) References Cited

U.S. PATENT DOCUMENTS

| | | | |
|---|---|---|---|
| 8,342,026 B2* | 1/2013 | Sugibayashi | G01C 19/5649 73/504.16 |
| 2004/0047625 A1 | 3/2004 | Ito et al. | |
| 2008/0054760 A1 | 3/2008 | Kataoka | |
| 2008/0055459 A1 | 3/2008 | Ito et al. | |
| 2009/0002542 A1 | 1/2009 | Ito et al. | |
| 2018/0309391 A1 | 10/2018 | Endou et al. | |

FOREIGN PATENT DOCUMENTS

| | | |
|---|---|---|
| JP | 5948781 B2 | 7/2016 |
| JP | 201777543 A | 4/2017 |
| JP | 2017229008 A | 12/2017 |

OTHER PUBLICATIONS

Supplementary European Search Report issued for EP 18 92 0087, dated Aug. 3, 2021 (7 pages).
International Search Report Issued for PCT/JP2018/046593, dated Mar. 26, 2019.
Written Opinion of the International Searching Authority issued for PCT/JP2018/046593, dated Mar. 26, 2019.

* cited by examiner

VIBRATION DEVICE AND DRIVING DEVICE

CROSS REFERENCE TO RELATED APPLICATIONS

The present application is a continuation of PCT/JP2018/046593, filed Dec. 18, 2018, which claims priority to Japanese Patent Application No. 2018-097900, filed May 22, 2018, the entire contents of each of which are incorporated herein by reference.

TECHNICAL FIELD

The present invention relates to vibration devices and driving devices.

BACKGROUND

The view of an imaging device used as a monitoring device, such as a camera, is desired to be constantly clear. Particularly for cameras used outdoors, which are installed in vehicles for example, various mechanisms have been proposed to remove water droplets, such as raindrops. Patent Document 1 (identified below), discloses a vibration device that includes a translucent portion disposed in a forward portion of the body of a camera. Water droplets are moved and atomized by vibrating a plate-like body including the translucent portion. In this vibration device, a higher-order resonant mode is utilized so that an antinode of vibration is positioned in a portion except a central portion of the plate-like body. The surface tension of water against the plate-like body during vibration differs between a portion of an antinode of the vibration and a portion of a node of the vibration. A difference in surface tension between the positions serves as driving force and water droplets move toward the antinodes of the vibration and after that, by further atomizing the water droplets, view is secured since the view is now clear.

Patent Document 1: Japanese Unexamined Patent Application Publication No. 2017-229008.

However, in the vibration device described in Patent Document 1, a difference in surface tension between the positions serves as driving force and therefore, whether a water droplet moves easily depends on a distance from an antinode of vibration. Thus, a water droplet can remain in a portion far from an antinode of vibration, which can be, for example, a central portion of the plate-like body.

On the other hand, when an amplitude is increased so as to remove water droplets reliably, there is a decrease in efficiency since driving voltage needs to be increased.

SUMMARY OF THE INVENTION

Accordingly, it is an object of the present invention is to provide a vibration device and a driving device that reliably enable water droplets to move.

In an exemplary embodiment, a vibration device is provided that includes a vibration element that includes a vibrator; and a driving device that causes the vibration element to vibrate. Moreover, the vibration element includes a translucent body, with the vibrator being electrically coupled to the driving device. The driving device includes a first circuit, a second circuit, and a switch. The first circuit applies an electric signal to the vibrator so as to render the vibration element in a resonant state, the second circuit applies, to the vibrator, an electric signal according to a feedback signal output from the vibration element, and the switch switches coupling between the first circuit and the vibrator and coupling between the second circuit and the vibrator at a certain timing.

Moreover, a driving device according to an exemplary embodiment is provided that causes a vibration element including a vibrator to vibrate. The driving device includes a first circuit that applies an electric signal to the vibrator so as to render the vibration element in a resonant state; a second circuit that applies, to the vibrator, an electric signal according to a feedback signal output from the vibration element; and a switch that switches coupling between the first circuit and the vibrator and coupling between the second circuit and the vibrator at a certain timing.

The exemplary embodiments of the present invention can provide a vibration device and a driving device that reliably enable water droplets to move.

DETAILED DESCRIPTION OF EMBODIMENTS

The present invention is clarified below by describing exemplary embodiments with reference to the drawings.

Each of the exemplary embodiments described herein is an example and it should be noted that partial replacements or combinations of the elements are possible between different embodiments.

Figure 1:
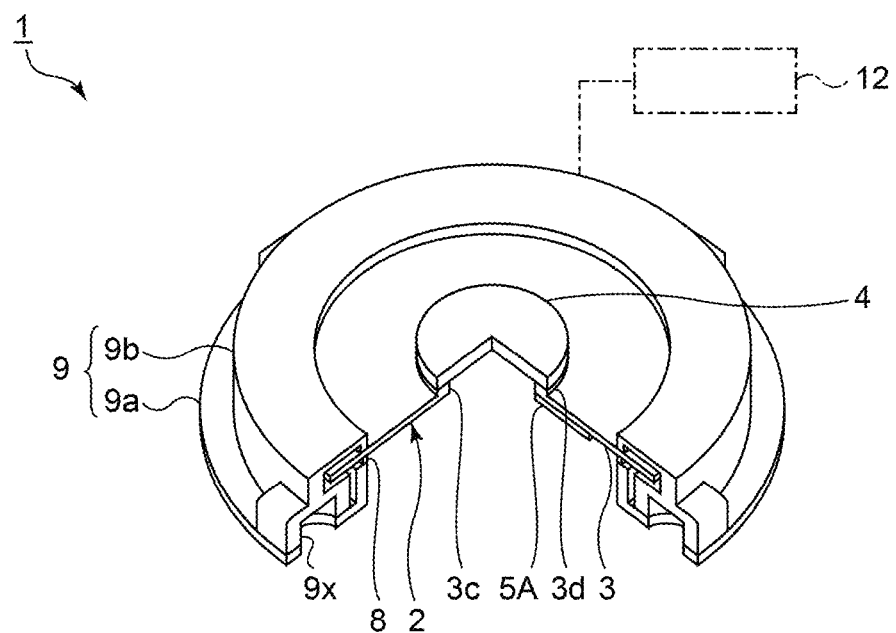
FIG. 1 is a partly cut perspective view of a vibration device according to a first embodiment.

FIG. 1 is a partly cut perspective view of a vibration device according to a first embodiment.

As shown, a vibration device 1 illustrated in FIG. 1 causes water droplets or foreign matters to move through vibration to remove the water droplets or the foreign matters from the inside of the view of an image pickup device. The vibration device 1 includes a vibration element 2, a case member 9, which holds the vibration element 2, and a driving device 12. The vibration element 2 is electrically coupled to the driving device 12.

Figure 2:
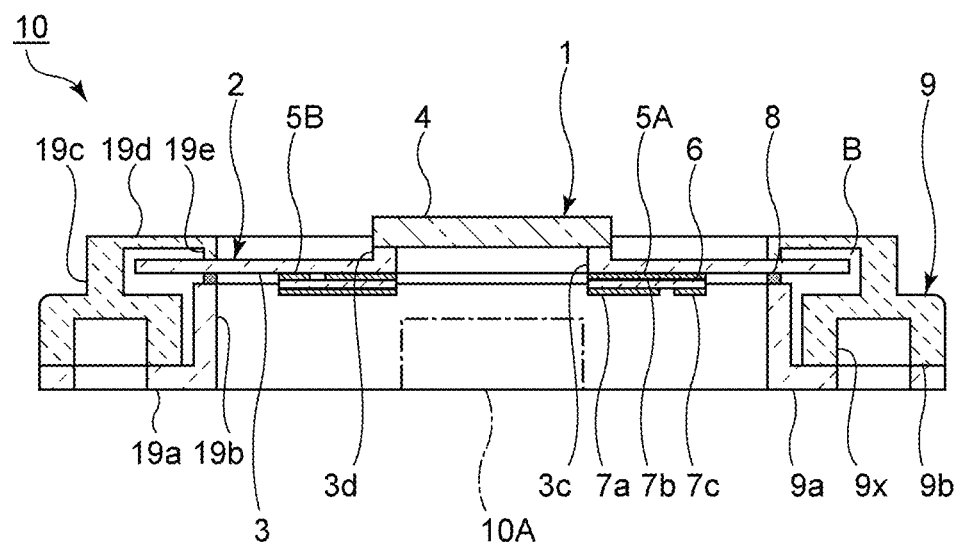
FIG. 2 is an elevated cross-sectional view of an imaging device including the vibration device according to the first embodiment.

FIG. 2 is an elevated cross-sectional view of an imaging device including the vibration device according to the first embodiment.

An image pickup device 10A, indicated with an alternate long and short dash line, is disposed in an internal space surrounded by the vibration element 2 and the case member 9. Thus, an imaging device 10 as an optical detection device according to an exemplary embodiment is configured. The imaging device 10 includes the vibration device 1 and the image pickup device 10A. Examples of the image pickup device 10A can include a CMOS, a CCD, a bolometer, a thermopile, and the like, which receive light with any wave length in a visible region to a far-infrared region. Examples of the imaging device 10 can include a camera, a radar or LIDAR device, and the like.

In the internal space, an optical detection element, which is different from the image pickup device 10A and optically detects energy ray, may be disposed. The energy ray to be detected may be, for example, an active energy ray, such as electromagnetic waves or an infrared ray. The detection region of the optical detection element is included in a translucent body portion, which is described later. In the imaging device 10 illustrated in FIG. 2, the view of the image pickup device 10A is included in the translucent body portion.

Figure 3:
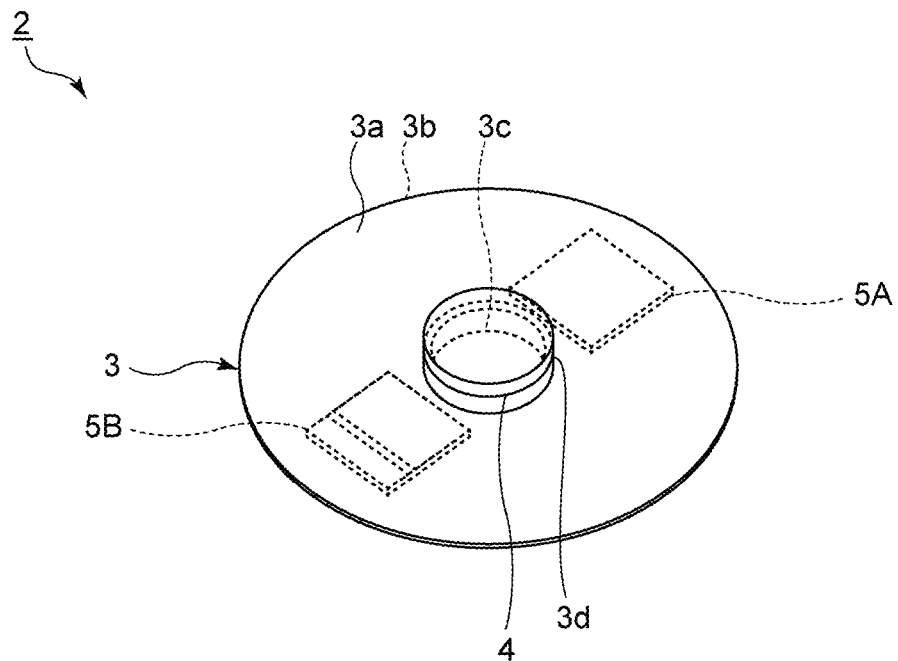
FIG. 3 is a perspective view of a vibration element according to the first embodiment.

FIG. 3 is a perspective view of the vibration element according to the first embodiment.

The vibration element 2 is shaped like an approximately circular plate. More specifically, the vibration element 2 includes the vibration body 3, which includes the cavity 3c in a central portion and is shaped like an approximately circular plate. The vibration body 3 includes a first principal surface 3a and a second principal surface 3b, which are opposite each other. The first principal surface 3a is a principal surface in an outer side portion of the vibration device 1 and the second principal surface 3b is a principal surface on the side of the internal space. In a direction perpendicular to the first principal surface 3a, an extension portion 3d extends from the outer circumferential edge of the cavity 3c in the first principal surface 3a. The extension portion 3d may be omitted in an alternative aspect.

With reference back to FIG. 2, a translucent body 4 is provided so as to cover the cavity 3c over the extension portion 3d of the vibration body 3. The translucent body 4 is made of a translucent material, such as translucent plastic, glass, or translucent ceramics, for example. Being translucent herein denotes being translucent enough to allow at least an energy ray or light with a wave length that the optical detection element detects to pass.

In the present embodiment, the shapes of the vibration body 3 and the translucent body 4 are circular in a plan view, which are however not limited to this shape, but may be approximately oval or be rectangular or polygonal, for example. Although the translucent body 4 is shaped like a circular plate, the shape may be like a dome for example.

On the second principal surface 3b of the vibration body 3, a piezoelectric vibrator 5A and a piezoelectric vibrator 5B are provided so as to face each other with the cavity 3c present therebetween. The piezoelectric vibrator 5A and the piezoelectric vibrator 5B of the vibration element 2 are coupled to the driving device 12.

The piezoelectric vibrator 5A includes a piezoelectric body 6, which is shaped like a rectangular plate. The piezoelectric body 6 is made from, for example, suitable piezoelectric ceramics, such as $Pb(Zr,Ti)O_3$ or $(K,Na)NbO_3$, or a suitable piezoelectric single crystal, such as $LiTaO_3$ or $LiNbO_3$. The shape of the piezoelectric body 6 is not limited to the above in alternative aspects.

The piezoelectric vibrator 5A includes a first electrode 7a and a feedback electrode 7c, which are provided on one of principal surfaces of the piezoelectric body 6. The first electrode 7a and the feedback electrode 7c are provided as being separate. The piezoelectric vibrator 5A includes a second electrode 7b, which is provided on the other principal surface of the piezoelectric body 6 so as to be opposite to and face the first electrode 7a. In the present embodiment, the first electrode 7a and the feedback electrode 7c are electrically coupled to the driving device 12. The second electrode 7b is coupled to the ground potential.

The piezoelectric vibrator 5B is similar in configuration to the piezoelectric vibrator 5A. The piezoelectric vibrator 5A is joined to the vibration body 3 on the side of the second electrode 7b and the piezoelectric vibrator 5B is joined to the vibration body 3 on the side of the first electrode and the feedback electrode. Thus, the piezoelectric vibrator 5A and the piezoelectric vibrator 5B vibrate in directions opposite each other with respect to the vibration body 3 and cause the vibration body 3 to vibrate.

By including the driving device 12, the vibration device 1 can move water droplets or the like that adheres to the translucent body 4 more reliably to the outside of the view of the image pickup device without depending on the above-described difference in surface tension. The details of this configuration are described below.

Figure 4:
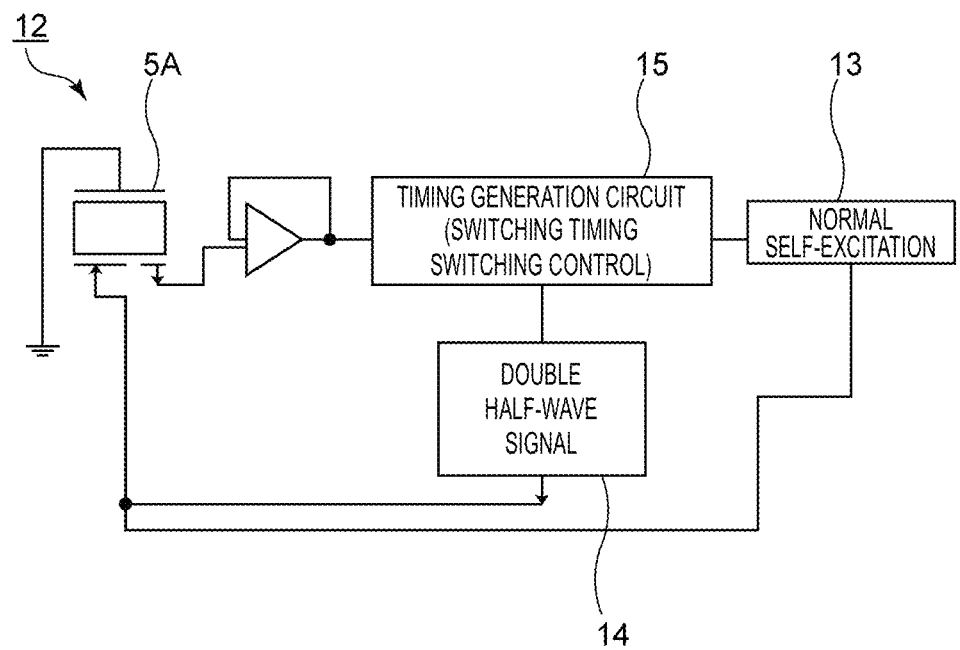
FIG. 4 is a schematic circuit diagram of a driving device according to the first embodiment.

FIG. 4 is a schematic circuit diagram of the driving device according to the first embodiment. Although FIG. 4 illustrates a form of coupling to a single piezoelectric vibrator, the driving device is also coupled to another piezoelectric vibrator, similarly.

The driving device 12 includes a first circuit 13, which applies an electric signal to the piezoelectric vibrator 5A so as to render the vibration element 2 in a resonant state. In a state where the first circuit 13 and the piezoelectric vibrator 5A are electrically coupled, a self-excitation circuit is configured. The driving device 12 includes a second circuit 14, which applies, to the piezoelectric vibrator 5A, an electric signal according to a feedback signal output from the piezoelectric vibrator 5A. The second circuit 14 applies an electric signal to the piezoelectric vibrator 5A so as to change the state of vibration of the vibration element 2, which is caused by the first circuit 13.

Further, the driving device 12 includes a switch 15 that is configured to switch coupling between the first circuit 13 and the piezoelectric vibrator 5A and coupling between the second circuit 14 and the piezoelectric vibrator 5A at a certain timing. More specifically, the switch 15 includes a timing generation circuit and controls a timing at which the circuit coupled to the piezoelectric vibrator 5A is switched from the first circuit 13 to the second circuit 14 and a switching width. Herein, the switching width denotes time taken to return the coupling from the second circuit 14 to the first circuit 13 after the switching to the second circuit 14.

The driving device 12 also applies an electric signal to the piezoelectric vibrator 5B illustrated in FIG. 2 and FIG. 3 in a similar manner for the piezoelectric vibrator 5A.

Figure 5:
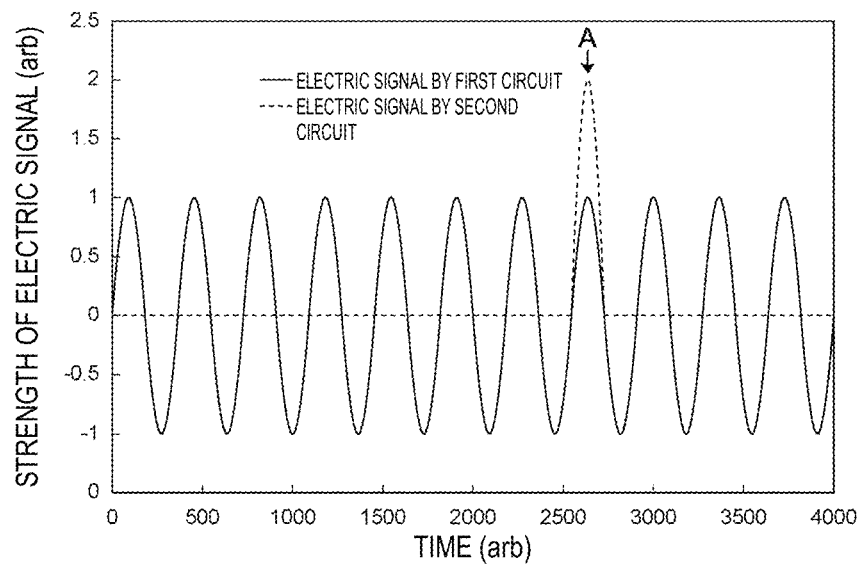
FIG. 5 is a chart that schematically indicates electric signals applied to a piezoelectric vibrator according to the first embodiment.

FIG. 5 is a chart that schematically indicates electric signals applied to the piezoelectric vibrator according to the first embodiment. In FIG. 5, the solid line indicates an electric signal applied to the piezoelectric vibrator by the first circuit and the broken line indicates an electric signal applied to the piezoelectric vibrator by the second circuit.

The first circuit 13 applies an alternating current signal to the piezoelectric vibrator 5A. Accordingly, the vibration element 2 is rendered in the resonant state and vibrates. In the present embodiment, the switch 15 is configured to switch the circuit coupled to the piezoelectric vibrator 5A from the first circuit 13 to the second circuit 14 at a certain (e.g., defined) timing.

Herein, an electric signal with a wave length being a half of the wave length of an electric signal by the first circuit 13 may be expressed as a half wave. The wave length being a half of the wave length denotes a half period. The second circuit 14 amplifies a feedback signal and as indicated with an arrow A in FIG. 5, a half wave is applied to the piezoelectric vibrator 5A. The strength of an electric signal by the second circuit 14 is not particularly limited, but in the exemplary embodiment, is double the strength of an electric signal by the first circuit 13.

After a half wave has been applied to the piezoelectric vibrator 5A from the second circuit 14, the switch 15 switches the circuit coupled to the piezoelectric vibrator 5A from the second circuit 14 to the first circuit 13. It is noted that, at the timing indicated with the arrow A in FIG. 5, only an electric signal by the second circuit 14 indicated with the broken line is applied to the piezoelectric vibrator 5A. Similar to the piezoelectric vibrator 5A, the piezoelectric vibrator 5B receives an electric signal applied.

Figure 6:
FIG. 6 is a schematic elevated cross-sectional view for describing a vibration mode of the vibration element according to the first embodiment.
Figure 6:
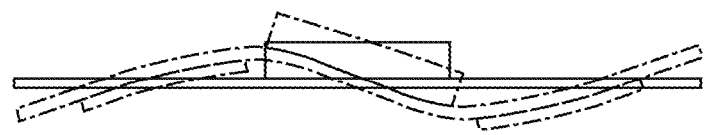
Figure 7:
FIG. 7 is a schematic perspective view for describing the vibration mode of the vibration element according to the first embodiment.
Figure 7:
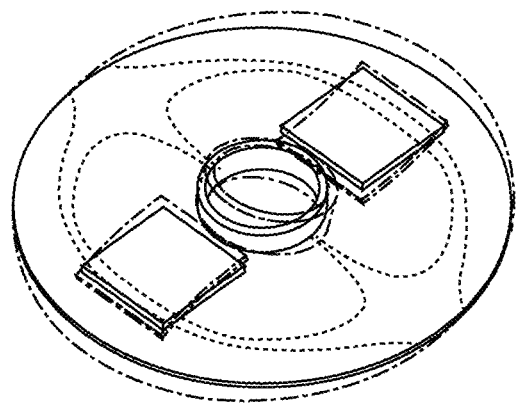

FIG. 6 is a schematic elevated cross-sectional view for describing a vibration mode of the vibration element according to the first embodiment. FIG. 7 is a schematic perspective view for describing the vibration mode of the vibration element according to the first embodiment. In FIG. 6 and FIG. 7, the solid lines indicate an early-stage state of the vibration element and the alternate long and short dash lines indicate a state in which the vibration element vibrates. In FIG. 7, the portions surrounded by the broken lines indicate nodes of vibration.

As illustrated in FIG. 6 and FIG. 7, the vibration element 2 of the present embodiment vibrates in a seesaw mode according to the first circuit 13. Herein, the seesaw mode denotes a vibration mode in which vibration is occurring while a line of nodes of the vibration extending in a radial direction of the vibration element serves as a rotation axis. As a result of a node of the vibration being positioned at the center of the vibration element 2, an antinode of the vibration is positioned in a portion except the center of the vibration element 2. The vibration mode in the present embodiment is a seesaw mode that has a line of nodes of vibration extending in a circumferential direction in addition to a line of nodes of vibration extending in a radial direction.

Through rotational vibration where a line of nodes of vibration extending in a radial direction serves as a rotation axis, acceleration is added to a water droplet or the like in a lateral direction in FIG. 6. In a case of standing vibration, addition of acceleration in one direction followed by addition of the same acceleration in an opposite direction is repeated and thus, a water droplet or the like moves to and fro in a range of certain positions. In this case, a water droplet or the like does not move from the range of certain positions. When the amplitude is large, a difference in surface tension of a water droplet or the like against the vibration element 2 between a portion of an antinode of the vibration and a portion of a node of the vibration is increased. In this case, with the difference in surface tension serving as driving force, the water droplet or the like can move toward an antinode of the vibration. However, as described above, water droplets or the like may partly remain. Accordingly, the water droplets or the like remaining continues to move to and fro in the range of certain positions.

With reference back to FIG. 4, features of the vibration device 1 and the driving device 12 according to the present embodiment are in that the first circuit 13 and the second circuit 14 are included, and further, the switch 15 is included that is configured to switch the first circuit 13 and the second circuit 14 from being coupled to each piezoelectric vibrator at a certain timing. In the present embodiment, a half wave obtained by amplifying a feedback signal is applied to each piezoelectric vibrator at a certain timing. Thus, deviation can be caused in a direction in which the vibration element 2 vibrates by applying an electric signal to amplify the vibration in one direction to each piezoelectric vibrator according to the feedback signal. Accordingly, a water droplet or the like can be moved more reliably in a certain direction. As a result, occurrence of reciprocating motion of a water droplet or the like can be hindered and the water droplet or the like can be moved to the outside of the view of the image pickup device more reliably.

In the present embodiment, without depending on a difference in surface tension between a portion of an antinode of vibration and a portion of a node of the vibration, water droplets or the like can be moved more reliably by causing deviation in a direction of the vibration. Thus, the necessity to make an amplitude large enough to increase a difference in surface tension between the aforementioned positions can be eliminated and water droplets can be moved efficiently.

As in the present embodiment illustrated in FIG. 5, it is preferable that an electric signal be applied to each piezoelectric vibrator by the second circuit 14 so as to have a phase the same as the phase of an electric signal by the first circuit 13. In addition, it is preferable that an electric signal with a strength higher than the strength of an electric signal by the first circuit 13 be applied to each piezoelectric vibrator by the second circuit 14. Accordingly, deviation can be caused effectively in a direction in which the vibration element 2 vibrates.

The phase of an electric signal by the second circuit 14 may not necessarily be the same as the phase of an electric signal by the first circuit 13. It is preferable that an electric signal by the second circuit 14 be applied to each piezoelectric vibrator so that the state of the vibration of the vibration element 2 according to the first circuit 13 is changed. Moreover, it is noted that the strength of an electric signal by the second circuit 14 may not necessarily be higher than the strength of an electric signal by the first circuit 13.

As described above, in the present embodiment, the translucent body 4 is provided over the extension portion 3d of the vibration body 3. Thus, the rotation force of the translucent body 4 at the time of vibration in a seesaw mode or the like can be increased. It should also be appreciated that the vibration body 3 itself may be a translucent body.

As illustrated in FIG. 2, the vibration element 2 is supported by the case member 9 and a sealing member 8 at nodes of vibration. More specifically, the case member 9 includes a first case portion 9a and a second case portion 9b. The first case portion 9a includes an approximately ring-like bottom portion 19a and an inner wall 19b extending from the inner circumferential edge of the bottom portion 19a. The inner wall 19b extends in a direction orthogonal to a ring-like surface of the bottom portion 19a. The ring-like sealing member 8 is provided at a distal end of the inner wall 19b. The sealing member 8 is not particularly limited, but can be a sealing rubber in an exemplary embodiment.

As further shown, the second case portion 9b is provided over the bottom portion 19a of the first case portion 9a. The second case portion 9b includes an outer wall 19c, which is opposite the inner wall 19b, and a top plate portion 19d, which is connected to the outer wall 19c and shaped like a ring while being opposite the bottom portion 19a. In the present embodiment, the outer wall 19c includes a step portion. The second case portion 9b includes a rib 19e that extends from the inner circumferential edge of the top plate portion 19d toward the bottom portion 19a. The rib 19e and the sealing member 8 are opposite each other. The vibration element 2 is supported by being sandwiched between the rib 19e of the second case portion 9b and the sealing member 8. The configuration of the case member 9 is not limited to the above. The vibration element 2 may be supported by the case member 9 through line contact or through point contact.

As illustrated in FIG. 7, the vibration element 2 is circular in a plan view and vibrates in the seesaw mode. Thus, part of nodes of the vibration of the vibration element 2 is approximately shaped like a ring. The rib 19e and the sealing member 8 are provided so as to extend along the nodes of the vibration of the vibration element 2. In the present embodiment, the nodes of vibration have a simple shape, which is approximately like a ring. Thus, the case member 9 can easily support the nodes of vibration in the vibration element 2. As a result, the hermeticity of the vibration device 1 can be enhanced effectively and even more reliably.

As in the present embodiment, it is preferable that the case member 9 include an air gap portion B so as not to be in contact with the vibration element 2 in a portion except the rib 19e of the second case portion 9b. Accordingly, hindrance of vibration of the vibration element 2 can be further suppressed.

In the case member 9 of the vibration device 1, four cylindrical depressed portions 9x are provided. More specifically, the depressed portions 9x penetrate the bottom portion 19a of the first case portion 9a and reach the inside of the second case portion 9b. For example, the depressed portion 9x can be a screw hole such that the vibration device 1 can be fixed to the outside using a screw or the like or can be connected to another case member. The shapes and number of the depressed portions 9x are not limited to the above. In an alternative aspect, the depressed portions 9x may be omitted from the case member 9.

Figure 8:
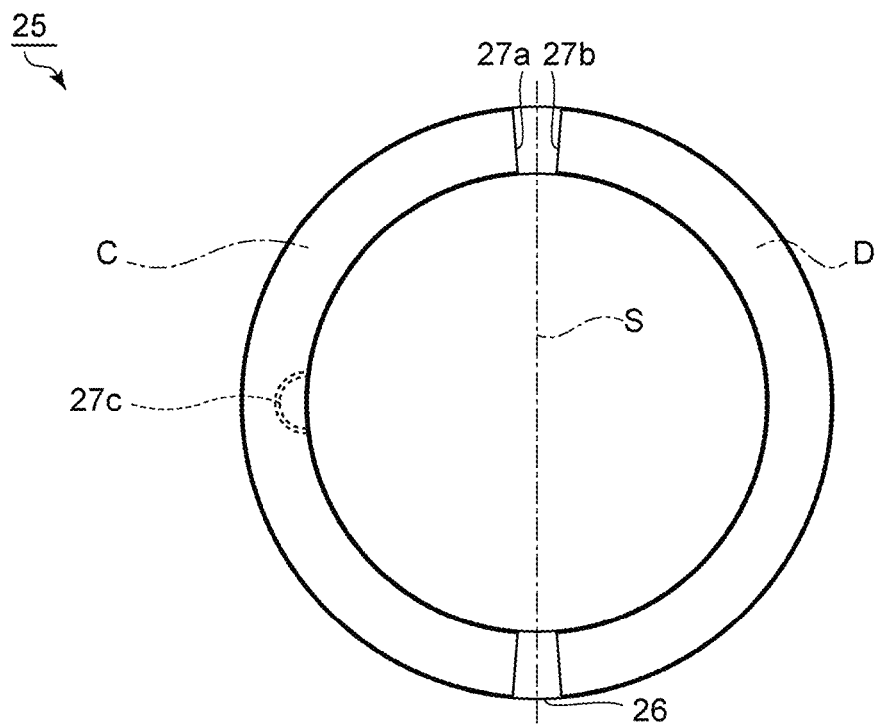
FIG. 8 is a plan view of a piezoelectric vibrator according to a variation of the first embodiment.

FIG. 8 is a plan view of a piezoelectric vibrator according to a variation of the first embodiment.

A piezoelectric vibrator 25 according to the present variation includes a ring-like piezoelectric body 26. The piezoelectric vibrator 25 includes a first region C and a second region D, which are adjacent to each other with a center line S running therebetween. A polarization axis direction of the piezoelectric body 26 is an identical direction in any region. On one principal surface of the piezoelectric body 26, a first electrode 27a is provided in the first region C and a second electrode 27b is provided in the second region D. On the other principal surface of the piezoelectric body 26, the second electrode 27b is provided in the first region C and the first electrode 27a is provided in the second region D. Thus, the first region C and the second region D vibrate in phases opposite each other.

A feedback electrode 27c is also provided on the other principal surface. The second electrode 27b includes a cut portion provided so that the feedback electrode 27c and the second electrode 27b do not come into contact. In addition, the cut portion need not necessarily be provided but it is sufficient if the feedback electrode 27c is not in contact with any other electrode of the piezoelectric vibrator 25.

The piezoelectric body 26 may be in polarization axis directions opposite each other in the first region C and the second region D. In this case, it is sufficient that electrodes are provided so that alternating current signals identical in phase is applied to the first region C and the second region D. For example, the second electrodes 27b may be provided in the first region C and the second region D on one principal surface and the first electrodes 27a may be provided in the first region C and the second region D on the other principal surface.

Figure 9:
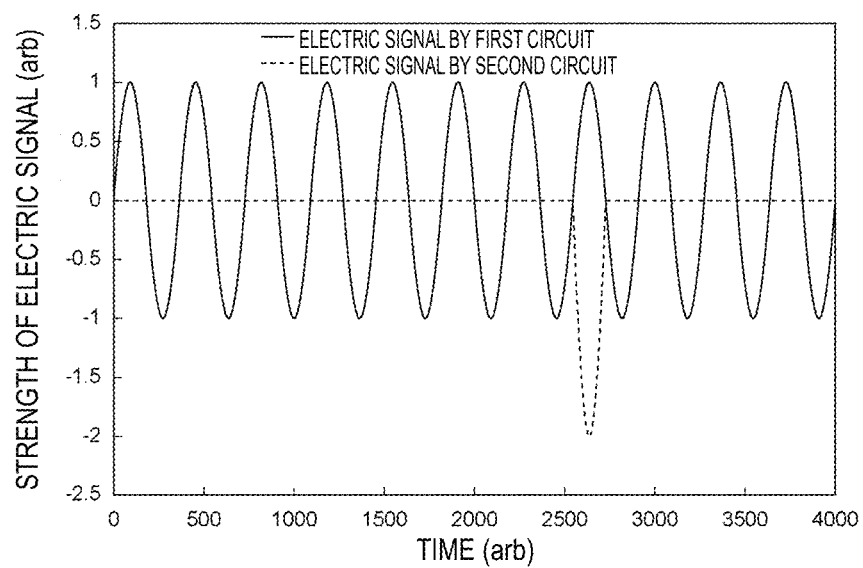
FIG. 9 is a chart that schematically indicates electric signals applied to a piezoelectric vibrator according to a second embodiment.

FIG. 9 is a chart that schematically indicates electric signals applied to a piezoelectric vibrator according to a second embodiment. In FIG. 9, the solid line indicates an electric signal applied to the piezoelectric vibrator by a first circuit and the broken line indicates an electric signal applied to the piezoelectric vibrator by a second circuit.

The second embodiment is different from the first embodiment in that an electric signal that attenuates vibration is applied to each piezoelectric vibrator by a second circuit 14 of a driving device 12. In the other respects, the vibration device according to the second embodiment has a configuration similar to that of the vibration device 1 according to the first embodiment described above.

As illustrated in FIG. 9, the second circuit 14 applies a half wave having a phase inverted relative to an electric signal by a first circuit 13 to each piezoelectric vibrator. Thus, an abrupt damped motion can be added on the vibration of the vibration element 2. Accordingly, a water droplet or the like can be moved more reliably in a certain direction without depending on a difference in surface tension. As a result, occurrence of a reciprocating motion of a water droplet or the like can be hindered and the water droplet or the like can be moved to the outside of the view of the image pickup device more reliably.

The strength of an electric signal by the second circuit 14 is double the strength of an electric signal by the first circuit 13. Thus, it is preferable that an electric signal by the second circuit 14 have a strength larger than the strength of an electric signal by the first circuit 13 and be a half wave having a phase inverted relative to an electric signal by the first circuit 13. Accordingly, a damped motion can be added on the vibration of the vibration element 2 effectively.

Figure 10:
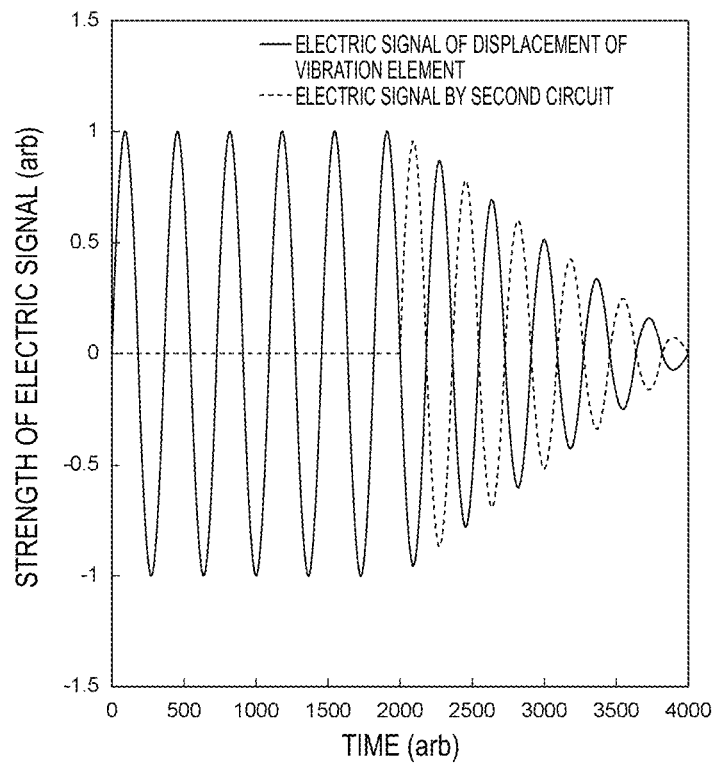
FIG. 10 is a chart that schematically indicates an electric signal of displacement of a vibration element and an electric signal applied to a piezoelectric vibrator according to a third embodiment.

FIG. 10 is a chart that schematically indicates an electric signal of displacement of a vibration element and an electric signal applied to a piezoelectric vibrator according to a third embodiment. In FIG. 10, the solid line indicates an electric signal of displacement of the vibration element and the broken line indicates an electric signal applied to the piezoelectric vibrator by a second circuit. The electric signal of displacement of the vibration element is a feedback signal or an electric signal obtained by amplifying the feedback signal.

The third embodiment is different from the first embodiment in an electric signal applied by the second circuit 14 of a driving device 12. In the other respects, the vibration device according to the third embodiment has a configuration similar to that of the vibration device 1 according to the first embodiment.

As illustrated in FIG. 10, the second circuit 14 applies an electric signal having a phase inverted relative to an electric signal of displacement of a vibration element 2 to each piezoelectric vibrator. At this time, an electric signal with a plurality of wave lengths is applied to each piezoelectric vibrator from the second circuit 14. More specifically, an electric signal is applied to each piezoelectric vibrator from the second circuit 14 so that the strength of an electric signal decreases gradually.

Figure 11:
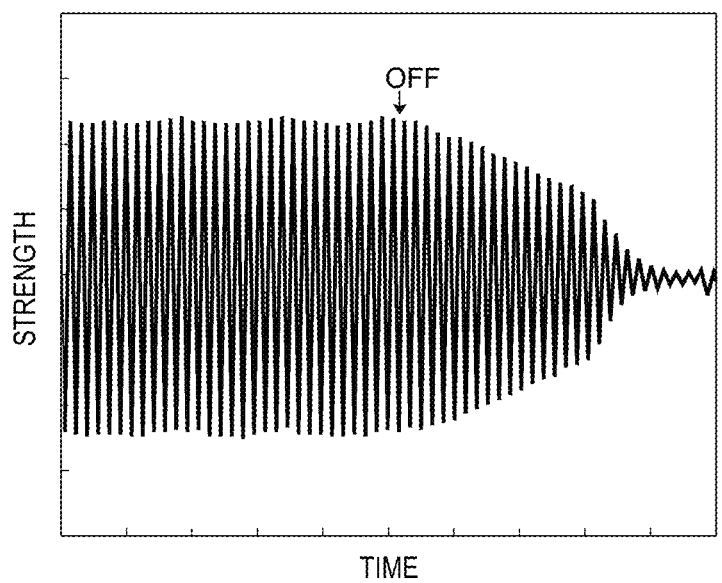
FIG. 11 is a chart for describing reverberation vibration of a vibration element according to a referential example.

Typically, when an electric signal to cause a vibration element to vibrate is stopped, as in a referential example illustrated in FIG. 11, the vibration element enters a state of reverberation vibration where the amplitude of the vibration decreases gently, and subsequently turns still.

Figure 12:
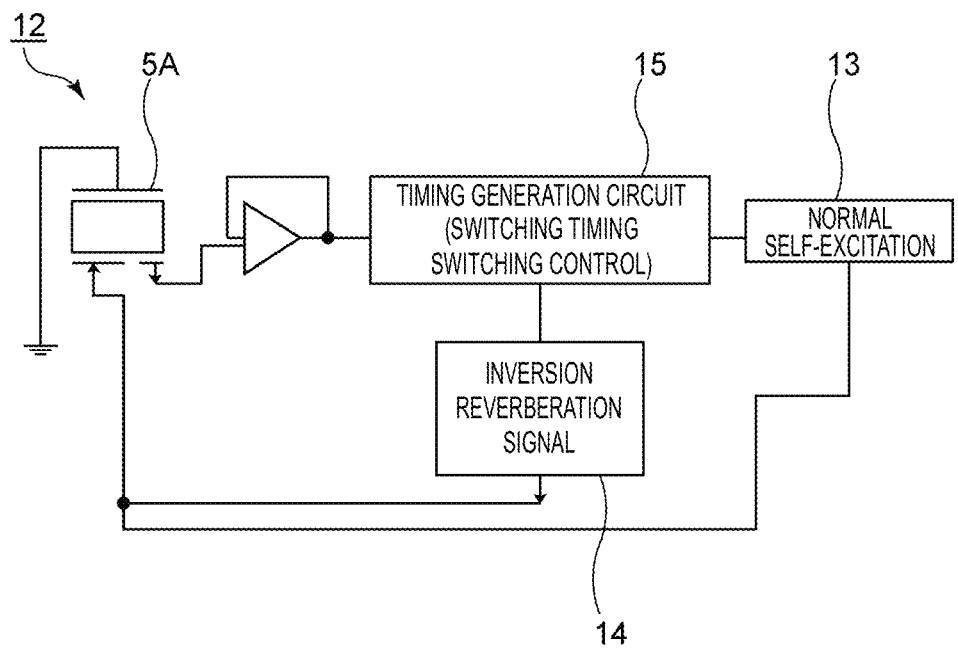
FIG. 12 is a schematic circuit diagram of a driving device according to the third embodiment.

In contrast, in the exemplary third embodiment as illustrated in FIG. 10 and FIG. 12, an inversion reverberation signal is applied to each piezoelectric vibrator by the second circuit 14. Herein, an inversion reverberation signal denotes an electric signal that has a phase inverted relative to an electric signal of reverberation vibration of the vibration element and corresponds to the strength of the electric signal of the reverberation vibration. In the driving device 12, an electric signal is applied to the piezoelectric vibrator from the second circuit 14 according to the vibration of the vibration element 2 after the circuit coupled to each piezoelectric vibrator has been switched from the first circuit 13 to the second circuit 14. Thus, a reverberation inversion signal is applied from the second circuit 14 to each piezoelectric vibrator. Accordingly, an abrupter damped motion can be added on the vibration element 2. As a result, without depending on a difference in surface tension, occurrence of a reciprocating motion of a water droplet or the like can further be hindered and the water droplet or the like can be moved to the outside of the view of the image pickup device even more reliably.

After switching the circuit coupled to each piezoelectric vibrator to the second circuit 14, the switch 15 is configured to switch the coupling to the first circuit 13 according to a set switching width. Thus, by repeating vibration and the abrupt damped motion, water droplets or the like can be moved further effectively.

Figure 13:
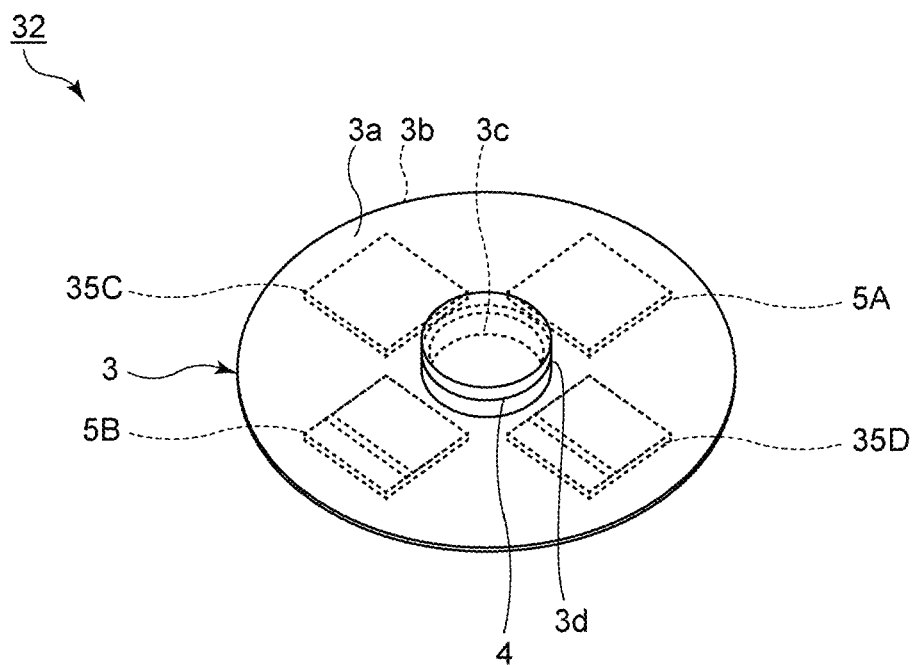
FIG. 13 is a perspective view of the vibration element according to the third embodiment.

FIG. 13 is a perspective view of a vibration element according to the third embodiment.

The vibration device according to the exemplary embodiment is different from that according to the first embodiment in the configuration of a vibration element 32 and a vibration mode used. In the other respects, the vibration device according to this embodiment has a configuration similar to that of the vibration device 1 according to the first embodiment.

The vibration element 32 includes a piezoelectric vibrator 35C and a piezoelectric vibrator 35D, which are opposite each other with a cavity 3c present therebetween. The piezoelectric vibrator 35C and the piezoelectric vibrator 35D are provided on a second principal surface 3b of a vibration body 3 together with a piezoelectric vibrator 5A and a piezoelectric vibrator 5B. A straight line connecting the piezoelectric vibrator 35C and the piezoelectric vibrator 35D is perpendicular to a straight line connecting the piezoelectric vibrator 5A and the piezoelectric vibrator 5B. The piezoelectric vibrator 35C and the piezoelectric vibrator 35D are similar in configuration to the piezoelectric vibrator 5A and the piezoelectric vibrator 5B.

In the vibration element 32, the phases of vibration of the piezoelectric vibrators that are adjacent to each other in a circumferential direction are different by 90°. Similar to the first embodiment, the phases of vibration of the piezoelectric vibrator 5A and the piezoelectric vibrator 5B that are opposite each other are different by 180°. The phases of vibration of the piezoelectric vibrator 35C and the piezoelectric vibrator 35D that are opposite each other are also different by 180°. Thus, the vibration element 32 vibrates in a rotational mode. Herein, the rotational mode is a vibration mode, where vibration is occurring while a line of nodes of vibration extending in a radial direction of the vibration element serves as a rotation axis and the rotation axis rotes at a certain period while the center of the vibration element serves as an axis.

In the present embodiment, since the vibration element 32 vibrates in the rotational mode, the nodes of vibration include an approximately ring-like portion. Accordingly, similar to the first embodiment, the nodes of vibration can be supported easily in the vibration element 32 and the hermeticity of the vibration device can be enhanced effectively and even more reliably.

In addition, the vibration device according to the present embodiment also includes the driving device 12 according to the first embodiment and thus, deviation can be caused in a direction in which the vibration element 32 vibrates. Accordingly, water droplets or the like can be moved more reliably to the outside of the view without depending on a difference in surface tension.

Figure 14:
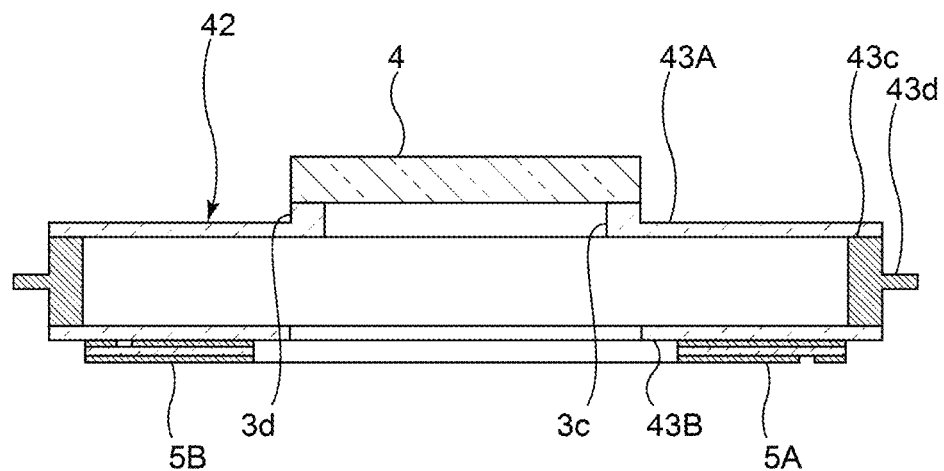
FIG. 14 is an elevated cross-sectional view of a vibration device according to a fourth embodiment.
Figure 15:
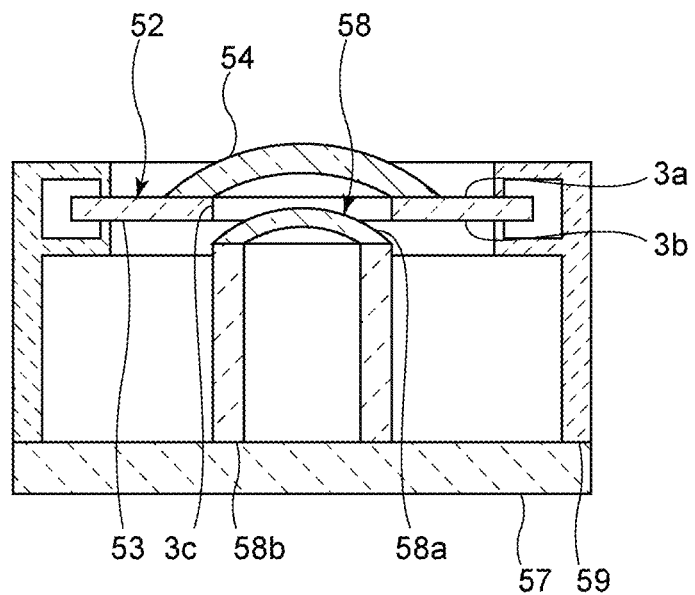
FIG. 15 is an elevated cross-sectional view of a vibration device according to a fifth embodiment.
Figure 16:
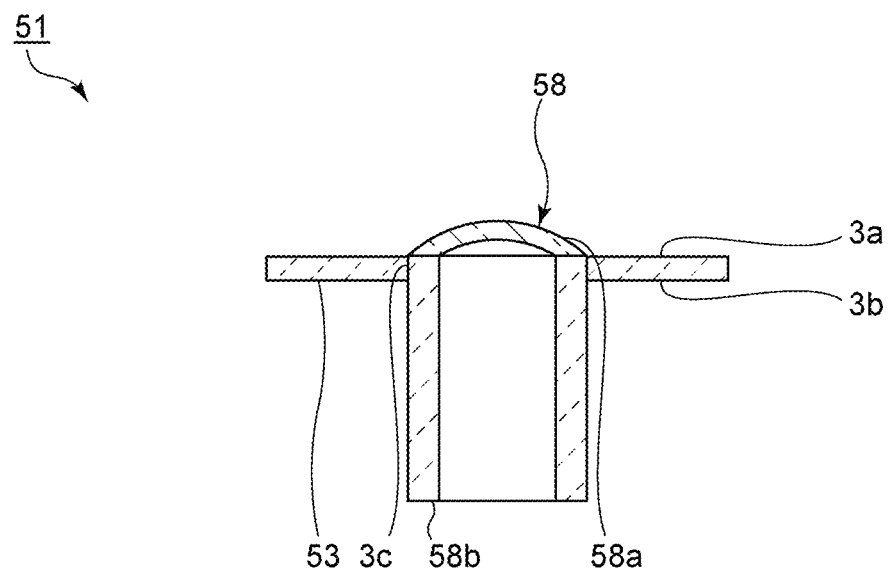
FIG. 16 is an elevated cross-sectional view of a vibration device according to a sixth embodiment.

FIGS. 14 to 16 illustrate fourth to sixth embodiments of Exemplary vibration devices. As shown, the fourth to sixth embodiments each include the driving device 12, similar to that according to the first embodiment, and thus, water droplets or the like can be moved to the outside of the view of the image pickup device more reliably.

FIG. 14 is an elevated cross-sectional view of the vibration device according to the fourth embodiment.

As shown, a vibration element 42 includes a first vibration body 43A and a second vibration body 43B, which are opposite each other. The first vibration body 43A has a configuration similar to that of the vibration body 3 according to the first embodiment and a translucent body 4 is provided over an extension portion 3d of the first vibration body 43A. The second vibration body 43B has a configuration similar to that of the first vibration body 43A in the other respects than that no extension portion is provided. The vibration element 42 according to the present embodiment vibrates in a seesaw mode or a rotational mode.

The vibration element 42 includes a support body 43c, which is disposed between the first vibration body 43A and the second vibration body 43B and couples the first vibration body 43A and the second vibration body 43B. More specifically, the support body 43c couples the outer circumferential edge of the first vibration body 43A and the outer circumferential edge of the second vibration body 43B throughout the circumferential direction. The shape of the support body 43c is approximately cylindrical. The support body 43c includes an outer surface and an inner surface, and a hinge portion 43d, which projects from the outer surface toward the outside in a radial direction. The vibration device according to the present embodiment is supported at the hinge portion 43d. The shape of the support body 43c is not limited to the above.

A piezoelectric vibrator 5A and a piezoelectric vibrator 5B, similar to those in the first embodiment, are provided on a principal surface of the second vibration body 43B, which is positioned in an outer side portion of the vibration device.

The piezoelectric vibrator 5A and the piezoelectric vibrator 5B may be provided on a principal surface of the second vibration body 43B on the side of the first vibration body 43A. The vibration element 42 may include the ring-like piezoelectric vibrator 25 illustrated in FIG. 8. In the present embodiment, nodes of vibration in a seesaw mode or a rotational mode are positioned on the hinge portion 43d rather than on the first vibration body 43A.

Figure 17:
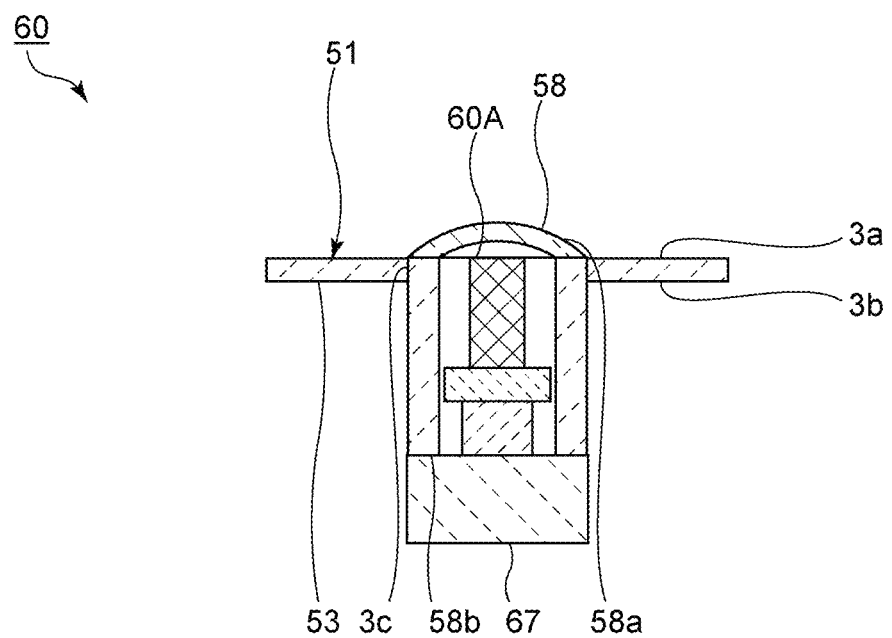
FIG. 17 is an elevated cross-sectional view of an imaging device according to a seventh embodiment.

FIG. 15 is an elevated cross-sectional view of a vibration device according to a fifth embodiment. In FIG. 15 and FIGS. 16 and 17, described later, a piezoelectric vibrator is omitted.

The vibration device according to the present embodiment includes a lens module 58. The lens module 58 includes a lens 58a and a lens holder 58b, which holds the lens 58a. A translucent body 54 of a vibration element 52 is a dome cover. A vibration body 53 is shaped like a ring and does not include the extension portion described above.

The vibration element 52 is supported by a case member 59. The case member 59 according to the present embodiment includes a rib to support a first principal surface 3a of the vibration body 53 and a rib to support a second principal surface 3b. Also in the present embodiment, similar to the first embodiment, the case member 59 supports the vibration element 52 at nodes of vibration.

The vibration device according to the present embodiment includes a bottom plate 57, and the case member 59 and the lens holder 58b are provided over the bottom plate 57. The lens module 58 is disposed in an internal space surrounded by the vibration element 52, the case member 59, and the bottom plate 57.

FIG. 16 is an elevated cross-sectional view of a vibration device according to a sixth embodiment.

The present embodiment is different from the fifth embodiment in that the inner circumferential edge of a vibration body 53 is joined to a lens holder 58b and includes no dome cover. A vibration device 51 according to the present embodiment enables water droplets or the like that adheres to a lens 58a as a translucent body to move through vibration more reliably without depending on a difference in surface tension.

Although not illustrated, also in the present embodiment, a case member 59 and the like similar to those in the fifth embodiment may be provided in an exemplary aspect.

FIG. 17 is an elevated cross-sectional view of an imaging device according to a seventh embodiment of the present invention.

An imaging device 60 includes the vibration device 51 according to the sixth embodiment and an image pickup device 60A. The imaging device 60 includes a bottom plate 67 and a lens holder 58b is provided over the bottom plate 67. The image pickup device 60A is disposed in an internal space surrounded by the bottom plate 67, the lens holder 58b, and the lens 58a. Also in the present embodiment, a case member 59 and the like similar to those in the fifth embodiment may be provided.

In the imaging device 60, by including the vibration device 51, water droplets or the like can be moved more reliably to the outside of the view of the image pickup device 60A without depending on a difference in surface tension.

Although the vibrator is a piezoelectric vibrator in each of the first to seventh embodiments, the vibrator may be, for example, an electromagnetic induction element, such as an electromagnetic actuator. An example in which the vibrator is an electromagnetic actuator is described below.

Figure 18:
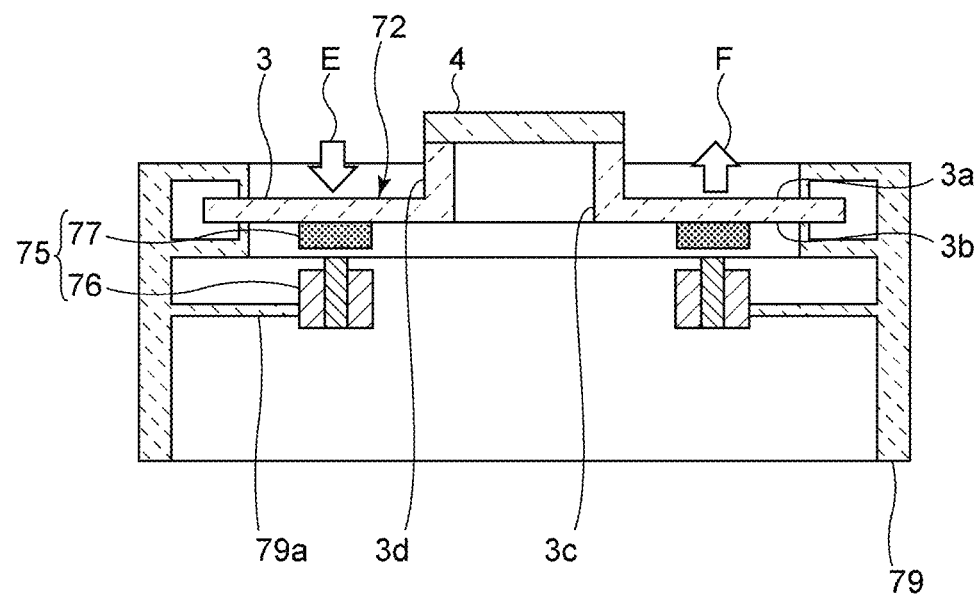
FIG. 18 is an elevated cross-sectional view of a vibration device according to an eighth embodiment.

FIG. 18 is an elevated cross-sectional view of a vibration device according to an eighth embodiment.

The present embodiment is different from the first embodiment in that the vibrator is an electromagnetic actuator 75. The electromagnetic actuator 75 includes a solenoid coil 76 and a magnet 77. In a driving device according to the present embodiment, a first circuit and a second circuit are coupled to the solenoid coil 76. The shape of a case member 79 is different from that in the first embodiment. In the respects other than the above, the vibration device and the driving device according to the present embodiment have configurations similar to those of the vibration device 1 and the driving device 12 according to the first embodiment.

The magnet 77 of the electromagnetic actuator 75 is provided on a second principal surface 3b of a vibration body 3. The case member 79 according to the present embodiment includes a support portion 79a, which extends from an inner surface toward the inside in a radial direction and supports the solenoid coil 76. In the respects other than the above, the case member 79 has a configuration similar to that of the case member 59 according to the fifth embodiment. The solenoid coil 76 is disposed so as to be opposite the magnet 77. A piezoelectric element may be joined to the vibration body 3 so as to generate and output a feedback signal corresponding to displacement of a vibration element 72. Alternatively, part or all of an electromagnetic actuator may be utilized so as to generate and output the above-mentioned feedback signal.

As indicated with an arrow E and an arrow F in FIG. 18, the vibration element 72 vibrates in a seesaw mode. Also in the present embodiment, coupling between a first circuit and the solenoid coil 76 and coupling between a second circuit and the solenoid coil 76 are switched at a certain timing. Accordingly, even when the vibration element 72 is configured to vibrate by the electromagnetic actuator 75, deviation can be caused in a vibration direction. Accordingly, water droplets or the like can be moved more reliably to the outside of the view without depending on a difference in surface tension.

Figure 19:
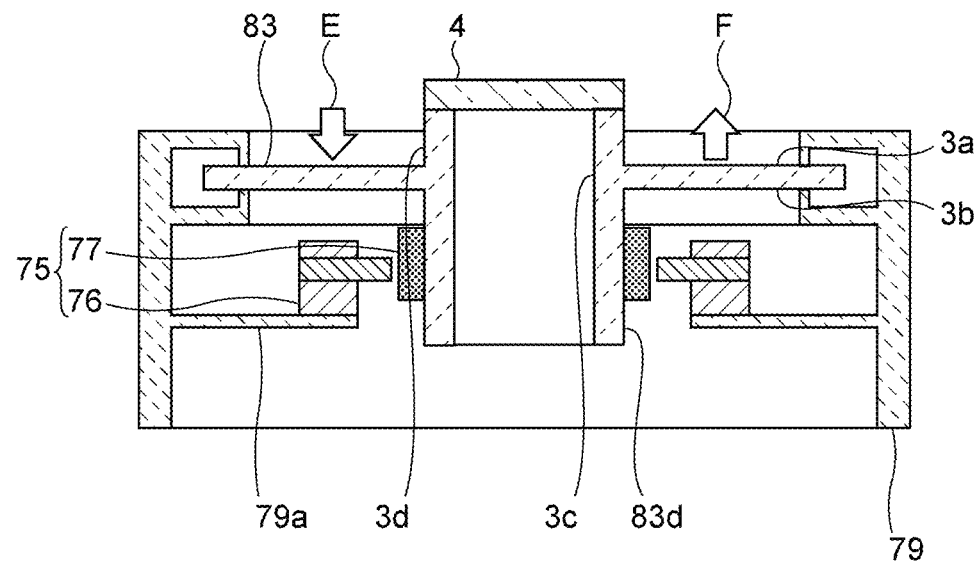
FIG. 19 is an elevated cross-sectional view of a vibration device according to a variation of the eighth embodiment.

The disposition of the electromagnetic actuator 75 is not limited to the above. For example, in a variation of the eighth embodiment illustrated in FIG. 19, a vibration body 83 includes an extension portion 83d, which extends toward an internal space of the vibration device. The magnet 77 is disposed on the outer surface in the extension portion 83d. The solenoid coil 76 is supported by the support portion 79a of the case member 79 so as to be opposite the magnet 77. Also in this case, water droplets or the like can be moved more reliably without depending on a difference in surface tension.

REFERENCE SIGNS LIST

1 VIBRATION DEVICE
2 VIBRATION ELEMENT
3 VIBRATION BODY
3a FIRST PRINCIPAL SURFACE
3b SECOND PRINCIPAL SURFACE
3c CAVITY
3d EXTENSION PORTION
4 TRANSLUCENT BODY
5A, 5B PIEZOELECTRIC VIBRATOR
6 PIEZOELECTRIC BODY
7a FIRST ELECTRODE
7b SECOND ELECTRODE
7c FEEDBACK ELECTRODE
8 SEALING MEMBER
9 CASE MEMBER
9a FIRST CASE PORTION

9b SECOND CASE PORTION
9x DEPRESSED PORTION
10 IMAGING DEVICE
10A IMAGE PICKUP DEVICE
12 DRIVING DEVICE
13 FIRST CIRCUIT
14 SECOND CIRCUIT
15 SWITCH
19a BOTTOM PORTION
19b INNER WALL
19c OUTER WALL
19d TOP PLATE PORTION
19e RIB
25 PIEZOELECTRIC VIBRATOR
26 PIEZOELECTRIC BODY
27a FIRST ELECTRODE
27b SECOND ELECTRODE
27c FEEDBACK ELECTRODE
32 VIBRATION ELEMENT
35C, 35D PIEZOELECTRIC VIBRATOR
42 VIBRATION ELEMENT
43A FIRST VIBRATION BODY
43B SECOND VIBRATION BODY
43c SUPPORT BODY
43d HINGE PORTION
51 VIBRATION DEVICE
52 VIBRATION ELEMENT
53 VIBRATION BODY
54 TRANSLUCENT BODY
57 BOTTOM PLATE
58 LENS MODULE
58a LENS
58b LENS HOLDER
59 CASE MEMBER
60 IMAGING DEVICE
60A IMAGE PICKUP DEVICE
67 BOTTOM PLATE
72 VIBRATION ELEMENT
75 ELECTROMAGNETIC ACTUATOR
76 SOLENOID COIL
77 MAGNET
79 CASE MEMBER
79a SUPPORT PORTION
83 VIBRATION BODY
83d EXTENSION PORTION

The invention claimed is:

1. A vibration device comprising:
a vibration element that includes a vibrator and a translucent body; and
a driving device that is electrically coupled to the vibrator and configured to cause the vibration element to vibrate, wherein the driving device including:
a first circuit configured to apply an electric signal to the vibrator to render the vibration element in a resonant state,
a second circuit configured to apply an electric signal to the vibrator based on a feedback signal output from the vibration element, and
a switch configured to switch between the first circuit being coupled to the vibrator and the second circuit being coupled to the vibrator,
wherein the vibrator of the vibration element includes a feedback electrode that is configured to generate the feedback signal.

2. The vibration device according to claim 1, wherein the second circuit is configured to apply the electric signal to the vibrator to amplify a vibration of the vibration element based on the feedback signal.

3. The vibration device according to claim 1, wherein the second circuit is configured to apply the electric signal to the vibrator to attenuate a vibration of the vibration element based on the feedback signal.

4. The vibration device according to claim 1, wherein the second circuit is configured to apply the electric signal to the vibrator at a predetermined timing, with electric signal having a wave length that is a half of a wave length of the electric signal applied by the first circuit.

5. The vibration device according to claim 3, wherein the second circuit is configured to apply the electric signal with a plurality of wave lengths to the vibrator, with each of the plurality of wave lengths being a wave length of the vibration of the vibration element.

6. The vibration device according to claim 5, wherein the second circuit is configured to apply the electric signal to the vibrator based on the vibration of the vibration element after the switch switches the coupling between the vibrator and the second circuit.

7. The vibration device according to claim 1, wherein the vibrator is a piezoelectric vibrator.

8. The vibration device according to claim 1, wherein the vibrator is an electromagnetic induction element.

9. The vibration device according to claim 1, wherein, the driving device is configured to cause the vibration element to vibrate in a seesaw mode.

10. The vibration device according to claim 1, wherein the driving device is configured to cause the vibration element to vibrate in a rotational mode.

11. The vibration device according to claim 1, wherein the vibration element comprises a circular plate shape.

12. The vibration device according to claim 1, further comprising a case member that holds the vibration element at a node of the vibration of the vibration element.

13. The vibration device according to claim 1, wherein the vibrator comprises a pair of piezoelectric vibrators that face each other with a cavity disposed therebetween.

14. The vibration device according to claim 13, wherein at least one piezoelectric vibrator of the pair of piezoelectric vibrators comprises a first electrode and the feedback electrode disposed on a first surface of a piezoelectric body and a second electrode disposed on a second surface of the piezoelectric body that opposes the first surface.

15. The vibration device according to claim 14, wherein the first electrode and the feedback electrode are electrically coupled to the driving device and the second electrode is electrically coupled to a ground potential.

16. The vibration device according to claim 1, wherein the driving device is configured to cause the vibration element to vibrate to move water droplets from the translucent body of the vibration element.

17. A vibration device comprising:
a vibration element that includes a vibrator and a translucent body; and
a driving device configured to cause the vibration element to vibrate to move water droplets from the translucent body of the vibration element,
wherein the driving device includes:
a first circuit configured to drive the vibrator to render the vibration element in a resonant state,
a second circuit configured to drive a vibration of the vibrator based on a feedback signal output from the vibration element, and a switch configured to switch between the first circuit being coupled to the vibrator and the second circuit being coupled to the vibrator,
wherein the vibrator of the vibration element includes a feedback electrode that is configured to generate the feedback signal.

18. The vibration device according to claim 17, wherein the second circuit is configured to apply an electric signal to the vibrator to amplify the vibration of the vibration element based on the feedback signal.

19. The vibration device according to claim 17, wherein the second circuit is configured to apply an electric signal to the vibrator to attenuate the vibration of the vibration element based on the feedback signal.

20. A driving device to cause a vibration element including a vibrator to vibrate, the driving device comprising:
   a first circuit configured to apply an electric signal to the vibrator so as to render the vibration element in a resonant state;
   a second circuit configured to apply an electric signal to the vibrator based on a feedback signal output from the vibration element; and
   a switch configured to switch between the first circuit being coupled to the vibrator and the second circuit being coupled to the vibrator at a defined timing;
   wherein the vibrator of the vibration element includes a feedback electrode that is configured to generate the feedback signal.

* * * * *